UNITED STATES PATENT OFFICE.

WALTER REDFEARN, OF GOOD THUNDER, MINNESOTA.

SWEEPING COMPOUND.

No. 907,403.  Specification of Letters Patent.  Patented Dec. 22, 1908.

Application filed July 22, 1908. Serial No. 444,823.

*To all whom it may concern:*

Be it known that I, WALTER REDFEARN, a citizen of the United States, residing at Good Thunder, in the county of Blue Earth and State of Minnesota, have invented a new and useful Sweeping Compound, of which the following is a specification.

This invention relates to a floor sweeping compound.

The object of the invention is to provide an article of this character to be used in sweeping floors, whether bare or carpeted, the salient feature or character of which is that it has an affinity for dust, dirt or other substances that settle on floors, and will retain such deposits against scattering or rising from the floor, as the compound is being swept to a point where it is to be collected. Furthermore to impart to the compound a moisture retaining quality that will materially add to its utility, and further to render the material odorous, so that its use will not be attended with any objectionable features.

With the above and other objects in view, as will appear as the nature of the invention is better understood, the same consists in the novel sweeping compound hereinafter fully described and claimed.

In carrying the invention into effect, the following ingredients are assembled in substantially the proportions specified:—water—1 gallon; catechu—4 ounces; bran—8 pounds; sawdust—4 pounds; sand—12 pounds; mineral oil—2 pounds, and essence of mirbane (nitro - benzin) sufficient to impart a pleasant odor to the mixture. The catechu is first dissolved in one gallon of boiling water, and to this is then added the bran and sawdust, or as much of each as can be stirred in. The compound is then allowed to stand until about ¾ of the water is evaporated, and then the sand and oil are added and thoroughly mixed. During the last step the mirbane will be added.

The above procedure is that which will generally be observed, but it may be varied to suit climatic conditions or the requirements of the manufacturer, that is to say, more or less of the different ingredients may be employed.

The hot solution of catechu causes the bran to curl or fold and also acts upon the gluten contained therein, forming a substance which unites with the mineral oil and causes it to retain the moisture and prevent evaporation to a great extent. The bran retains its moisture indefinitely and remains soft and pliable, and rolls over a floor and gathers and holds the dirt or dust when used. The sawdust is added to separate the moist bran, and also to cheapen the cost, but if preferred, sand may be used for the same purpose.

I claim:—

1. A sweeping compound consisting of water, catechu, bran. sawdust, and mineral oil, substantially in the proportions specified.

2. A sweeping compound consisting of water, catechu, bran, a separator for the bran, mineral oil, and an odorant substantially in the proportions specified.

3. A sweeping compound consisting of water—1 gallon; catechu—4 ounces; bran—8 pounds; sawdust 4 pounds; mineral oil—2 pounds, and an odorant.

In testimony that I claim the foregoing as my own, I have hereto affixed my signature in the presence of two witnesses.

WALTER REDFEARN.

Witnesses:
 F. H. MORCOCK,
 H. C. MIELKE.